(12) United States Patent
Fukuzawa et al.

(10) Patent No.: US 7,567,673 B2
(45) Date of Patent: Jul. 28, 2009

(54) COMMON KEY SHARING METHOD AND WIRELESS COMMUNICATION TERMINAL IN AD HOC NETWORK

(75) Inventors: Yasuko Fukuzawa, Yokohama (JP); Shuichi Ishida, Yokohama (JP); Eriko Ando, Kawasaki (JP); Susumu Matsui, Machida (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 11/090,168

(22) Filed: Mar. 28, 2005

(65) Prior Publication Data

US 2005/0215234 A1    Sep. 29, 2005

(30) Foreign Application Priority Data

Mar. 26, 2004    (JP)    ............................. 2004-091615

(51) Int. Cl.
*H04L 9/08*    (2006.01)
(52) U.S. Cl. ........................ 380/270; 380/278; 713/169
(58) Field of Classification Search ................... 380/270
See application file for complete search history.

(56) References Cited

U.S. PATENT DOCUMENTS

| | | | |
|---|---|---|---|
| 7,292,842 B2* | 11/2007 | Suzuki | ........................ 455/411 |
| 7,310,335 B1 | 12/2007 | Garcia-Luna-Aceves et al. | |
| 2002/0016926 A1* | 2/2002 | Nguyen et al. | ............... 713/201 |
| 2002/0037736 A1 | 3/2002 | Kawaguchi et al. | |
| 2002/0114469 A1* | 8/2002 | Faccin et al. | ................. 380/270 |
| 2002/0154781 A1* | 10/2002 | Sowa et al. | ................. 380/278 |
| 2003/0026433 A1* | 2/2003 | Matt | ......................... 380/278 |
| 2005/0152305 A1* | 7/2005 | Ji et al. | ........................ 370/328 |
| 2006/0174116 A1* | 8/2006 | Balfanz et al. | ............... 713/168 |

FOREIGN PATENT DOCUMENTS

| | | |
|---|---|---|
| CN | 1483266 | 3/2004 |
| EP | 1 102 430 A1 | 5/2001 |
| JP | 2002-111679 | 4/2002 |

* cited by examiner

*Primary Examiner*—Matthew B Smithers
(74) *Attorney, Agent, or Firm*—Antonelli, Terry, Stout & Kraus, LLP.

(57) ABSTRACT

The present invention relates to a common key sharing method in an ad hoc network constituted by wireless communication terminals implemented with relay functions thereon, comprising a common key generating step in which a first wireless communication terminal responsible for relaying generates a common key, a common key distributing step in which the first wireless communication terminal responsible for relaying distributes the common key to a second wireless communication terminal within a wireless communication area, and a transferring step in which the second wireless communication terminal which received the common key holds the common key, and the second wireless communication terminal transfers the common key to a third wireless communication terminal within a wireless communication area, when the second wireless communication terminal is responsible for relaying. Accordingly, it is possible to share a common encryption key within the ad hoc network.

11 Claims, 7 Drawing Sheets

COMMON KEY SHARING METHOD AND WIRELESS COMMUNICATION TERMINAL IN AD HOC NETWORK

TECHNICAL FIELD OF THE INVENTION

The present invention relates to an ad hoc network which is a temporary network constituted by wireless communication terminals implemented with relay functions thereon. More particularly, it relates to a technique that enhances security of the ad hoc network.

BACKGROUND OF THE INVENTION

A development in technology concerning ad hoc network which is a temporal network constituted by wireless communication terminals implemented with relay function is in progress.

In the ad hoc network, the communication terminals are on even ground with one another and act in autonomous and distributed manner, without depending on an existing particular network infrastructure, such as telephone line, portable phone network, and the Internet network. Therefore, the communication terminals (nodes) within a wireless communication area are allowed to exchange information directly via radio communication. Even when the nodes are not allowed to exchange information directly with each other, due to a location where radio wave does not reach, exchange of information is available through relaying by intermediate nodes (radio multihop communication).

In the above mentioned ad hoc network, when a closed communication network where only communication terminals belonging to a specific group are allowed to communicate with one another is constituted, it is necessary to prevent a connection from a communication terminal not belonging to the group and also to prevent leakage of communication data, in order to ensure security of the information within the group.

With regard to the security of the closed communication network, for example, Japanese Patent Laid-open Publication No. 2002-111679 (hereinafter, referred to as "Patent Document 1") discloses a technique which ensures security, by distributing a common key for use in encryption and the like, in a group communication method which autonomously builds a closed network with unspecified number of communication terminals. Concretely, there has been suggested that PtoP (Peer to Peer) connection is established between a communication terminal as a sending source of calling message and a communication terminal being a responder, and the common key is distributed by a public key of the communication terminal on the responding side, thereby sharing the common key within the group.

In addition, EP Patent Laid-open specification No. 102430 (hereinafter, referred to as "Patent Document 2") discloses a technique which authenticates a node that is not directly connected, when a communication terminal attempts to join the ad hoc network.

SUMMARY OF THE INVENTION

It is to be noted that the technique as disclosed in the Patent Document 1 has a premise in that the communication terminals constituting the closed communication network, mutually configure the PtoP connection. Therefore, the function of distributing a common key for sharing the key, in particular, cannot be applied as it is, to the ad hoc network in which the multihop communication is employed.

As for the Patent Document 2, the function of distributing the common key is not considered either. Furthermore, it is desirable to efficiently perform an authentication processing in the ad hoc network, in which nodes tend to move intensely.

It is a first object of the present invention to allow a common encryption key to be shared within the ad hoc network.

It is a second object of the present invention to efficiently perform the authentication processing in the ad hoc network.

In order to solve the problems above, a common key sharing method according to the first aspect of the present invention relates to a common key sharing method in an ad hoc network constituted by wireless communication terminals implemented with relay functions thereon, comprising:

a common key generating step in which a first wireless communication terminal responsible for relaying generates a common key;

a common key distributing step in which the first wireless communication terminal responsible for relaying distributes the common key to a second wireless communication terminal within a wireless communication area; and a transferring step in which the second wireless communication terminal which received the common key holds the common key, and the second wireless communication terminal transfers the common key to a third wireless communication terminal within a wireless communication area, when the second wireless communication terminal is responsible for relaying.

Each of the wireless communication terminals responsible for relaying in the ad hoc network generates a common key, and performs a distribution and transferring of the common key within the wireless communication area, whereby all the wireless communication terminals constituting the ad hoc network are allowed to share the common key.

In order to solve the problems above, a wireless communication terminal according to the second aspect of the present invention relates to a wireless communication terminal implemented with relay function thereon, which is provided for constituting an ad hoc network, comprising:

a network information generating means in which the wireless communication terminal sends/receives information regarding a network configuration to/from a second wireless communication terminal within a wireless communication area and generates network configuration information;

a common key generating means in which the wireless communication terminal generates a common key when itself being determined as responsible for relaying;

a common key distributing means in which the wireless communication terminal distributes the common key thus generated to a second wireless communication terminal within the wireless communication area; and a transferring means in which when the second wireless communication terminal receives the common key, the second wireless communication terminal holds the common key, and transfers the common key thus received to a third wireless communication terminal within the wireless communication area, when the second wireless communication terminal itself being determined as responsible for relaying.

Here, the wireless communication terminal further includes an authentication means in which the wireless communication terminal authenticates the second wireless communication terminal, wherein the network information generating means prevents a connection of unauthenticated wireless communication terminal to the ad hoc network, by sending/receiving information regarding the network configuration between the wireless communication terminal and the second wireless communication terminal having already been authenticated.

Here, with the network configuration information it is possible to authenticate the wireless communication terminal constituting the ad hoc network, and when the second wireless communication terminal having been authenticated moves out of the wireless communication area and the second wireless communication terminal is not recognized as a terminal constituting the ad hoc network within a predetermined period of time, the common key generating means updates the common key, and the common key distributing means distributes the common key thus updated.

With such a configuration as described above, if the wireless communication terminal having been once disconnected returns into the ad hoc network within a predetermined period of time, the processing for updating the common key can be omitted.

In the case where the second wireless communication terminal having constituted the ad hoc network moves out of the ad hoc network, and returns into the wireless communication area within a predetermined period of time, it is possible to configure the authentication means such that it does not perform authentication with the second wireless communication terminal. This configuration makes the authentication processing more efficient.

DETAILED DESCRIPTION OF THE PREFERRED EMBODIMENTS OF THE INVENTION

Detailed description of the preferred embodiment according to the present invention will be explained with reference to accompanying drawings.

Figure 1:
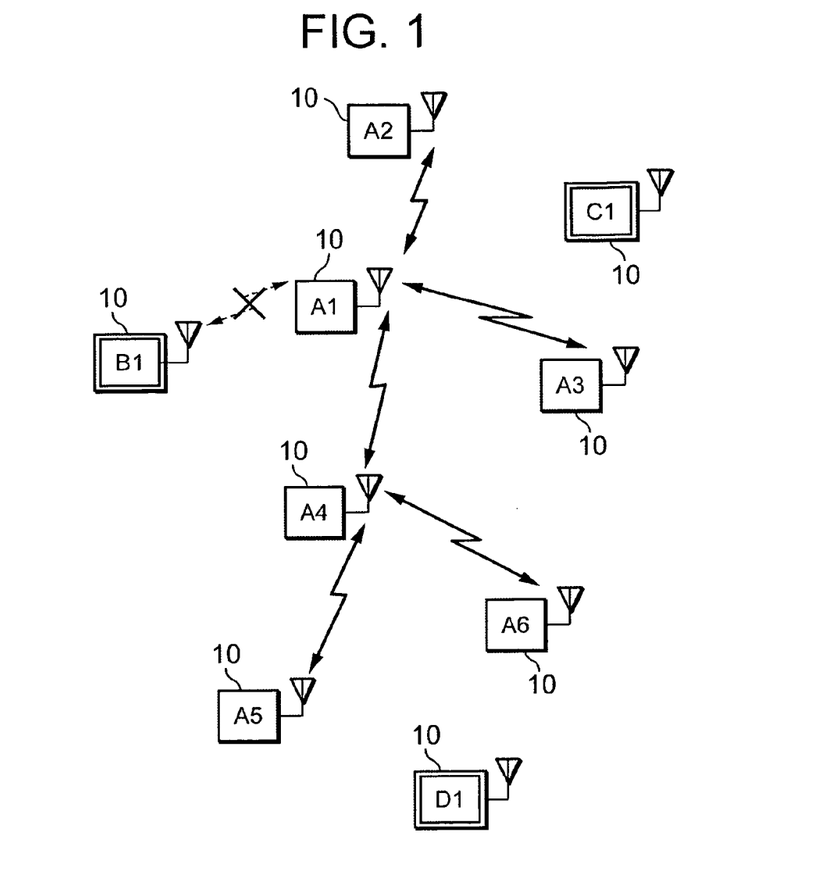
FIG. 1 is a diagram showing a concept of an ad hoc network according to the present invention.

FIG. 1 is a diagram showing a concept of an ad hoc network according to the present invention. In FIG. 1, communication terminals 10 (A1 to A6) belonging to a particular group within unspecified number of communication terminals 10 (nodes) constitutes the ad hoc network which is a temporary closed communication network, via autonomous and distributed radio communication.

Concretely, the communication terminal 10 (A1) is in a state of connection with the communication terminals 10 (A2 to A4), and the communication terminal 10 (A4) is in a state connection with the communication terminals 10 (A1, A5, and A6). As described below, those communication terminals belonging to a group are assumed to be in a connection state when those terminals enter the radio wireless communication areas of one another. Accordingly, the communication terminals 10 (A1 to A6) are allowed to mutually communicate with each other within the group. For example, the communication terminal 10 (A2) is not in a state of connection with the communication terminal 10 (A6). However, by relaying via the communication terminal 10 (A1) and the communication terminal 10 (A4), the communication terminal 10 (A2) is allowed to communicate with the communication terminal 10 (A6).

The present invention has been made to ensure security within the group as described above. According to the present invention, in the case where a communication terminal 10 (B1), which does not belong to the group, enters the wireless communication area of the communication terminal 10 (A1), it is configured such that the communication terminal B1 is not allowed to enter the ad hoc network. In other words, according to the present invention, on the occasion of connection to the ad hoc network, mutual authentication is performed, and only an authenticated communication terminal is allowed to participate in the ad hoc network.

According to the present invention, in order to protect communication data within the ad hoc network, the communication data is firstly encrypted and then transmitted. A key utilized for this encryption and decryption is shared as a common key by all of the communication terminals 10 connected to the ad hoc network. There exist one key or multiple keys in the ad hoc network and this key is referred to as "ad hoc key" in the present specification. The present invention provides a technique to share the ad hoc key, by each of the communication terminals 10 in the ad hoc network.

As for the ad hoc key, it is generated uniquely by each MPR (Multi Point Relays) node, which will be described below, and distributed in the ad hoc network. Therefore, there exist ad hoc keys whose count correspond to the count of MPR nodes, and shared by each of the communication terminals 10. Each ad hoc key is provided with an identifier, whereby it is possible to identify which ad hoc key is used for encryption.

Each communication terminal 10 manages an inter-node key and an inside-circle key, in addition to the ad hoc key, and encrypts communication between the communication terminals 10, or communication within a wireless communication area thereof (referred to as "inside-circle"). In particular, the inside-circle key is utilized also in distributing the ad hoc key.

For example, the communication terminal 10 (A1) generates the inside-circle key of the communication terminal 10 (A1), distributes the inside-circle key thus generated to the communication terminals 10 having been mutually authenticated with the communication terminal 10 (A1), that is, corresponding to communication terminals 10 (A2 to A4) in the example of FIG. 1. Then, the inside-circle key is shared by each of the communication terminals 10 (A1 to A4). Therefore, in the example of FIG. 1, there exist six inside-circle keys, A1 to A6, in total.

The inter-node key is a key which is shared by the communication terminals 10 which have been mutually authenticated. Therefore, in the example of FIG. 1, there exist five inter-node keys, A1-A2, A1-A3, A1-A4, A4-A5, and A4-A6.

It is assumed here that each of the inter-node key, inside-circle key, and ad hoc key may include a plurality of keys according to uses such as integrity assurance key for generating MAC (Message Authentication Code) which assures data integrity, in addition to an encryption key for encrypting the communication data and reauthentication key.

Figure 2:
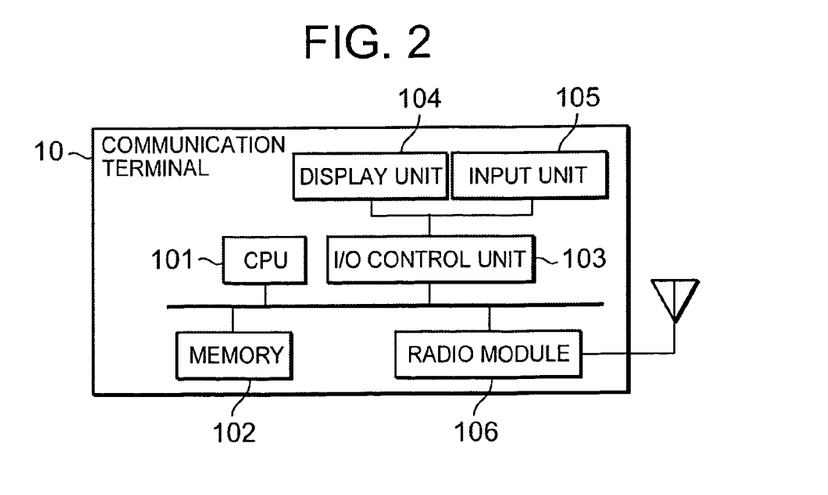
FIG. 2 is a block diagram showing an example of hardware configuration of communication terminal 10.

FIG. 2 is a block diagram showing an example of hardware configuration of the communication terminal 10 according to the present invention. As shown in FIG. 2, the communication terminal 10 is provided with CPU 101, memory 102, I/O control unit 103, display unit 104 such as a liquid crystal display, input unit 105 such as pointing device and button keys, and radio module 106. A typical communication terminal provided with such a configuration as described above is, for example, a portable information processor, portable phone, and the like. It is a matter of course that the hardware configuration of the communication terminal 10 is not limited to this.

The radio module 106 carries out a radio communication conforming to a specification which is currently being standardized by IEEE 802.11: ANSI/IEEE Std 802.11 1999 Edition. It is to be noted that the radio module 106 may establish communication in accordance with another radio specification, for example, a radio specification employing a portable phone network.

Here, before explaining a functional configuration of the communication terminal 10, a routing system in the ad hoc network will be briefly explained. As for the routing system in the ad hoc network, standardization is now under consideration in IETF MANet (Mobile Ad Hoc Networking), but in the present example, OLSR (Optimized Link State Routing) system as one of proposed ones will be explained as a way of example. The OLSR system is a so-called Proactive type routing system. The present invention is not limited to this system, and it may be applied to another Proactive type or a routing system of Reactive type, a Hybrid type or the like.

In the OLSR system, each communication terminal 10 autonomously broadcasts Hello message as a control message, every 2 seconds, for example. Here, it is assumed that the Hello message includes an identifier of sending source, a list of neighbor nodes available for direct (1 hop) communication, and MPR node list that will be explained next. Another communication terminal 10 existing within the wireless communication area is to receive this Hello message. As for the mutual authentication, it is not considered here.

The other communication terminal 10, which received the Hello message, refers to the Hello message. If there exists a node which allows an indirect communication by a transfer to the sending source node of the Hello message, even though the other communication terminal itself is not allowed to directly establish communication with the node, the sending source node is identified as MPR node. Thereafter, the node thus identified as MPR node is added to the MPR node list in the Hello message to be transmitted next, and then transmission is carried out.

For example, in FIG. 1, the communication terminal 10 (A2) is not allowed to establish communication directly with the communication terminal 10 (A3), but indirect communication is possible by way of the communication terminal 10 (A1) In this case, according to the Hello message from the communication terminal 10 (A1), the communication terminal 10 (A1) is identified as MPR node for the communication terminal 10 (A2), and the identifier of the communication terminal 10 (A1), for example, IP address of A1 is included in the MPR node list in the Hello message that is transmitted from the communication terminal 10 (A2).

Figure 4A:
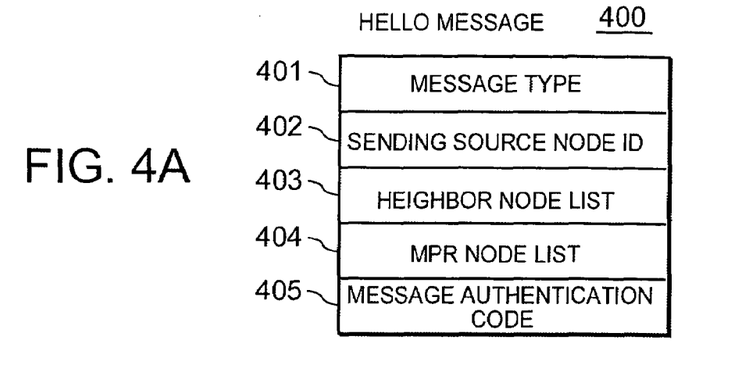
FIG. 4A is a diagram showing an example of a format of Hello message.

FIG. 4A is a diagram showing an example of Hello message format. In the example as shown in FIG. 4A, the Hello message 400 includes, message type 401 indicating that it is Hello message, source node ID 402 for identifying a communication terminal 10 that send this message, one-hop neighbor node list 403, MPR node list 404 as a list of MPR for source node, and MAC (Message Authentic Code) 405 which assures the integrity of this message contents. For example, IP address serves as source node ID 402. In addition, as for the one-hop neighbor node list 403 and the MPR node list 404, each node included in the lists can also be identified according to IP address.

The communication terminal 10, which is now selected as MPR, autonomously broadcasts Tc (Topology Control) message, for example, every 5 seconds, in addition to the Hello message. Here, it is assumed that the Tc message includes selected MPR node list, which is a list of nodes currently selected as MPR node. It is possible to determine whether or not the own communication terminal 10 is selected as MPR node, by referring to a Hello message transmitted from the other communication terminal 10.

The MPR node that received Tc message transfers this Tc message to a neighbor node.

Each communication terminal 10 having received the hello and the Tc message generates and updates a routing table on the basis of the Tc message. With this table, each communication terminal 10 is allowed to recognize topology of the ad hoc network, and controls the delivery of communication data within the ad hoc network in accordance with the routing table.

Figure 3:
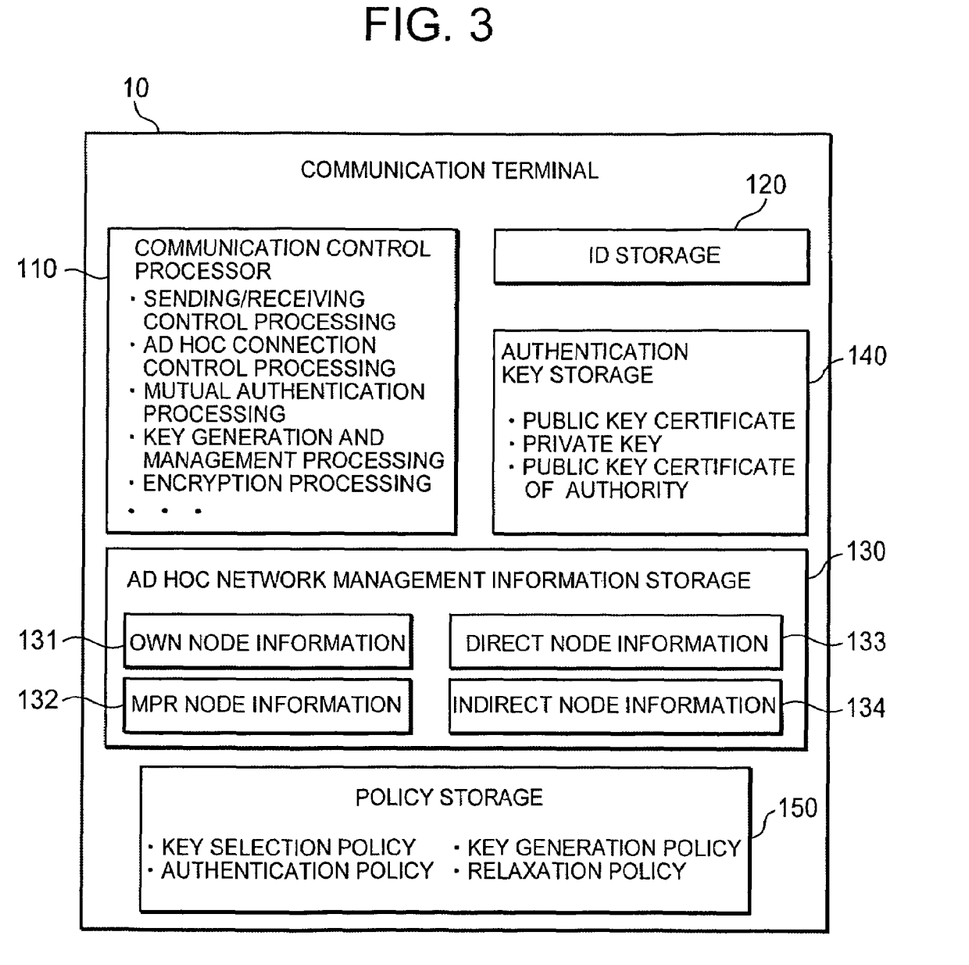
FIG. 3 is a block diagram showing an example of functional configuration of the communication terminal 10.

FIG. 3 is a block diagram showing an example of functional configuration of the communication terminal 10 according to the present invention. Those functional elements are virtually configured on the communication terminal 10, when the CPU 101 executes a processing in accordance with a program code, data, and the like, which are recorded in the memory 102.

As shown in FIG. 3, the communication terminal 10 is provided with communication control processor 110, ID storage 120, ad hoc network management information storage 130, authentication-use key storage 140, and policy storage 150.

The communication control processor 110 carries out, sending/receiving control processing, ad hoc connection control processing, mutual authentication processing, key generation and management processing, encryption processing, and the like. The ID storage 120 stores identification information to identify the communication terminal 10. For example, it is possible to use IP address, MAC address, and the like as the identification information. The ad hoc network management information storage 130 stores information required in constituting the ad hoc network. The authentication key storage 140 stores a key which is used at the time of mutual authentication processing between communication terminals, and the key may be of a public key cryptosystem, including public key certificate of the communication terminal, private key of the communication terminal, and public key certificate of Authority, for instance. A key of common encryption system such as AES may be used. The policy storage 150 records a policy that the communication control processor 110 refers to, regarding the sending/receiving control processing, ad hoc connection control processing, mutual authentication processing, key generation management processing, encryption processing, and the like.

The ad hoc network management information storage 130 stores own node information 131, MPR node information 132, direct node information 133, and indirect node information 134.

Figure 5A:
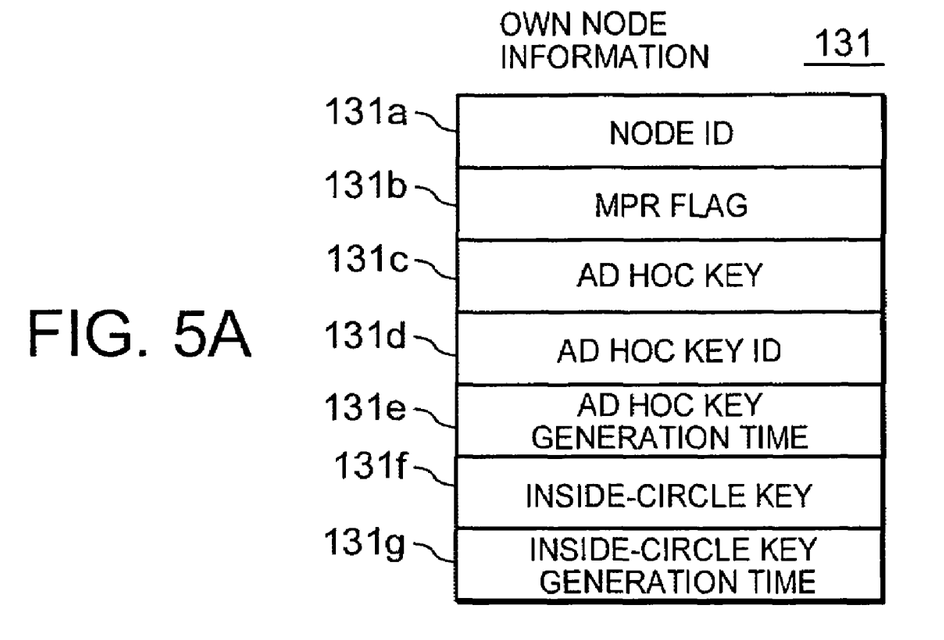
FIG. 5A is a diagram showing an example of data items to be managed by own node information 131.

FIG. 5A is a diagram showing an example of data items managed by the own node information 131. The own node information 131 manages data regarding the communication terminal 10 itself.

In the example as shown in FIG. 5A, the own node information 131 stores and manages, node ID 131a, MPR flag 131b, ad hoc key 131c, ad hoc key ID 131d, ad hoc key generation time 131e, inside-circle key 131f, and inside-circle key generation time 131g.

The node ID 131a is an identifier of the communication terminal 10, and IP address may serve as the identifier. The MPR flag 131b is a flag which indicates whether the own terminal is selected as the MPR node. The ad hoc key 131c stores an ad hoc key generated by the own terminal. The ad hoc key ID 131d stores an ad hoc key identifier to identify the ad hoc key. The ad hoc key identifier includes a part or all of information such as node ID, ad hoc key generation time and the like, and it may be set according to an identification rule, which allows the ad hoc key to be uniquely identified within the entire ad hoc network. The ad hoc key generation time 131e stores the time when the ad hoc key is generated. The inside-circle key 131f stores an inside-circle key generated by the own terminal. The inside-circle key 131g stores the time when the inside-circle key is generated.

The own node information 131 may include another information such as status information or the like which indicates the status of the own node, for instance.

Figure 5B:
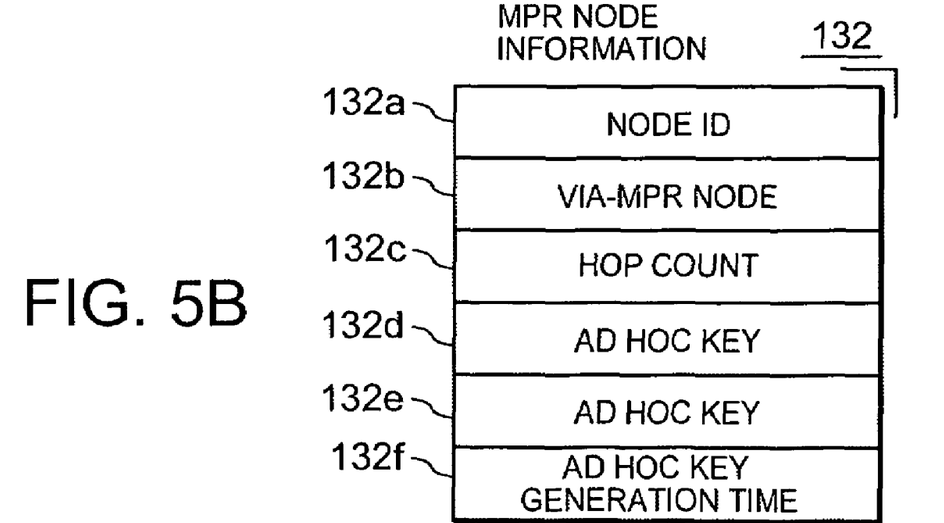
FIG. 5B is a diagram showing an example of data items to be managed by MPR (Multi Point Relays) node information 132.

FIG. 5B is a diagram showing an example of data items which is managed by the MPR node information 132. The MPR node information 132 manages the data items regarding MPR node existing in the ad hoc network, in a form of list in units of MPR node. It is to be noted that the MPR node is a node which serves as a source for generating Tc message.

In the example as shown in FIG. 5B, the MPR node information 132 stores and manages, node ID 132a, via-MPR node 132b, hop count 132c, ad hoc key 132d, ad hoc key ID 132e, and ad hoc key generation time 132f.

The node ID 132a is an identifier of MPR, and, for example, IP address may serve as the identifier. The via-MPR node 132b is an identifier of MPR node, to which data transfer is requested, when the data is transmitted to the MPR node with the node ID 132a. The hop count 132c stores the number of the hops from the own communication terminal 10 to the MPR node. The ad hoc key 132d stores the ad hoc key which the MPR node generated. The ad hoc key ID 132e stores an identifier of the ad hoc key that the MPR node generated. The ad hoc key generation time 132f stores the generation time when the ad hoc key 131d is generated.

The MPR node Information 132 may include another information such as status information or the like which indicates the status of the MPR node, for instance.

It is to be noted here that the latest keys are stored for the respective keys, but multiple number of keys including past keys may be stored as far as each of the keys can be identified.

Figure 6A:
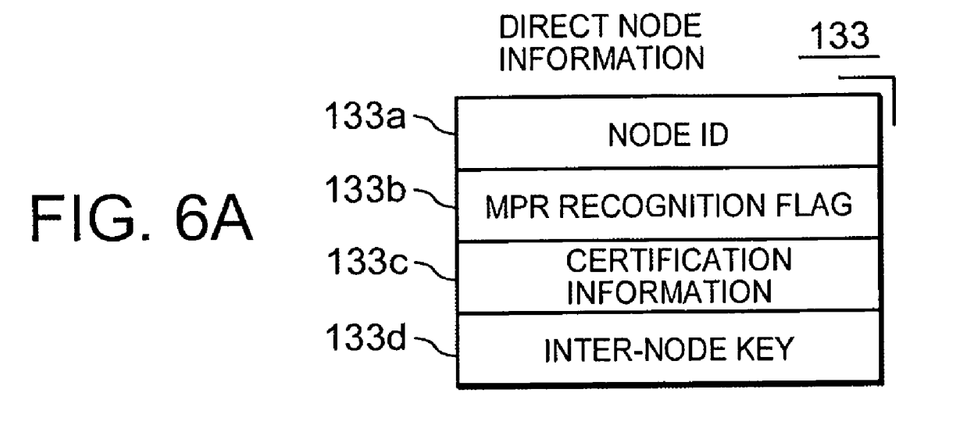
FIG. 6A is a diagram showing an example of data items to be managed by direct node information 133.

FIG. 6A is a diagram showing an example of data items to be managed by the direct node information 133. The direct node information 133 manages information regarding neighbor node which allows a direct wireless communication with the own node by one hop, in a form of list in units of node. Here, a connection is established with the neighbor node after mutual authentication is performed.

In the example as shown in FIG. 6A, the direct node information 133 stores and manages, node ID 133a, MPR recognition flag 133b, certification information 133c, and inter-node key 133d.

The node ID 133a is an identifier of the neighbor node, and, IP address may serve as the identifier. The MPR recognition flag 133b is a flag indicating whether the neighbor node regards the own communication terminal 10 as MPR node. The certification information 133c is information regarding mutual authentication with the neighbor node. The inter-node key 133d is a key which is shared with the neighbor node. The inter-node key 133d is generated and shared at the time of mutual authentication.

The direct node information 133 may include another information such as status information or the like which indicates an inter-node status, for instance.

Figure 6B:
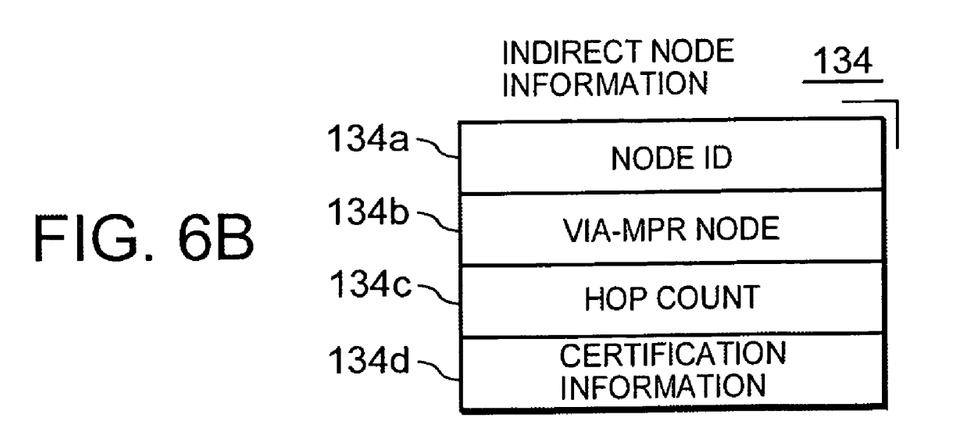
FIG. 6B is a diagram showing an example of data items to be managed by indirect node information 134.

FIG. 6B is a diagram showing an example of data items to be managed by the indirect node information 134. The indirect node information 134 manages information regarding an indirect node which is allowed to establish indirect communication with the own node, in a form of list in units of node. Here, the communication is established with the indirect node via MPR node.

In the example as shown in FIG. 6B, the indirect node information 134 stores and manages, node ID 134a, via-MPR node 134b, hop count 134c, and certification information 134d.

The node ID 134a is an identifier of the indirect node, and for example, IP address may serve as the identifier. The via-MPR node 134b is an identifier of the MPR node to which data transfer is requested, when data is transmitted to the indirect node. The via-MPR node is a direct node, and a plurality of via-MPR nodes may exist. The hop count 134c stores the number of hops from the own communication terminal 10 to the indirect node. The certification information 134d is certification data, such as MAC included in the Tc message, which is transmitted by the communication terminal 10 selected as an MPR node in association with the indirect node. Accordingly, integrity of the indirect node can be guaranteed indirectly.

The indirect node information 134 may include another information such as status information or the like which indicates a status of the indirect node, for instance.

Since data structure of the ad hoc network management information storage 130 is different by routing system, it is assumed to be associated with the routing system employed by the ad hoc network.

When data communication is established within the ad hoc network, each communication terminal 10 encrypts transmission data by use of any one of the ad hoc keys recorded in the MPR node information 132. Then, each communication terminal 10 broadcasts the data, while including in a message, a key identifier indicating which ad hoc key has been used.

For example, it is configured such that the policy storage 150 records information as a key selection policy, as to which key is to be used. The key selection policy may be defined, for example, as a policy to select the latest key. At this stage, it is further possible to define idle time W, and to employ a policy to select the latest key, within the ad hoc keys that have been delivered prior to the time W before the ad hoc key selection timing. If W is "zero", the latest key is selected.

Figure 4B:
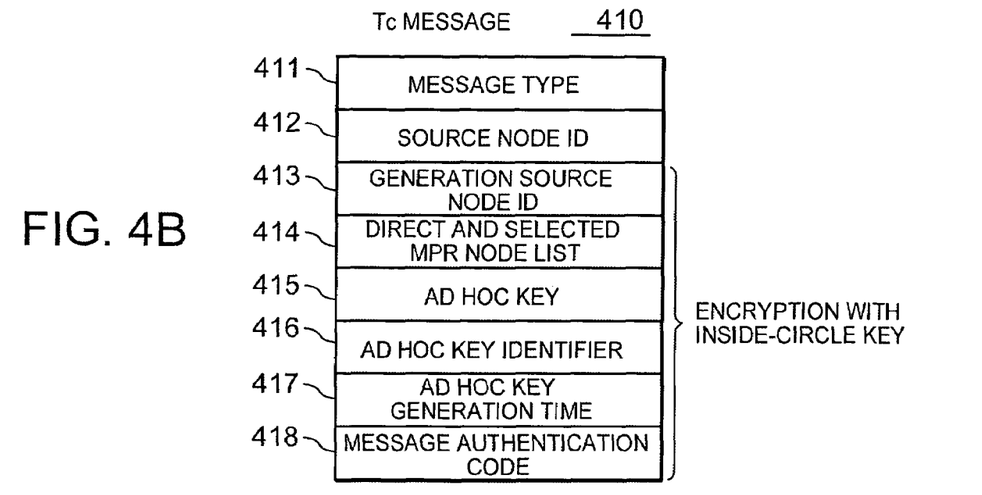
FIG. 4B is a diagram showing an example of a format of Tc message.
Figure 4C:
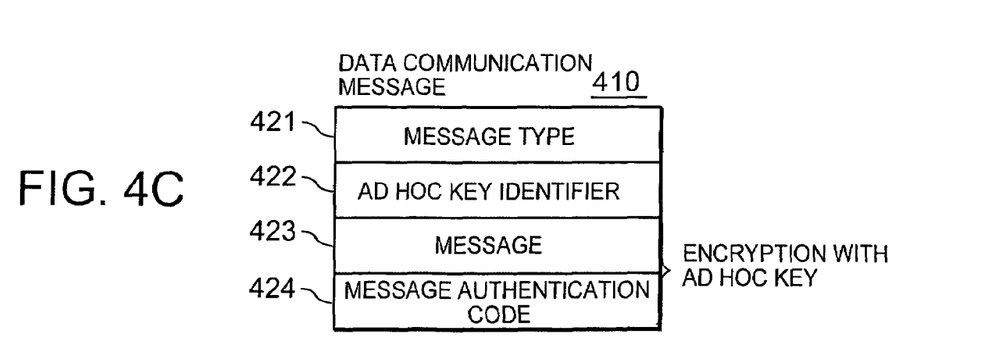
FIG. 4C is a diagram showing an example of a format of data communication message 420.

FIG. 4C is a diagram showing an example of a format of data communication message 420. In the example of FIG. 4C, the data communication message 420 includes, a message type 421 indicating the data communication message, ad hoc key identifier 422 for specifying an ad hoc key used for encryption, message 423 being transmission data, and MAC 424 assuring integrity of the message contents.

As for the message 423 and MAC code 424 within those elements, they are encrypted by use of the ad hoc key indicated by the ad hoc key identifier. Though not illustrated, the data communication message may include control information such as IP address of the communication terminal 10 as a destination, group identifier, and IP address of the communication terminal 10 as a sending source.

Figure 7:
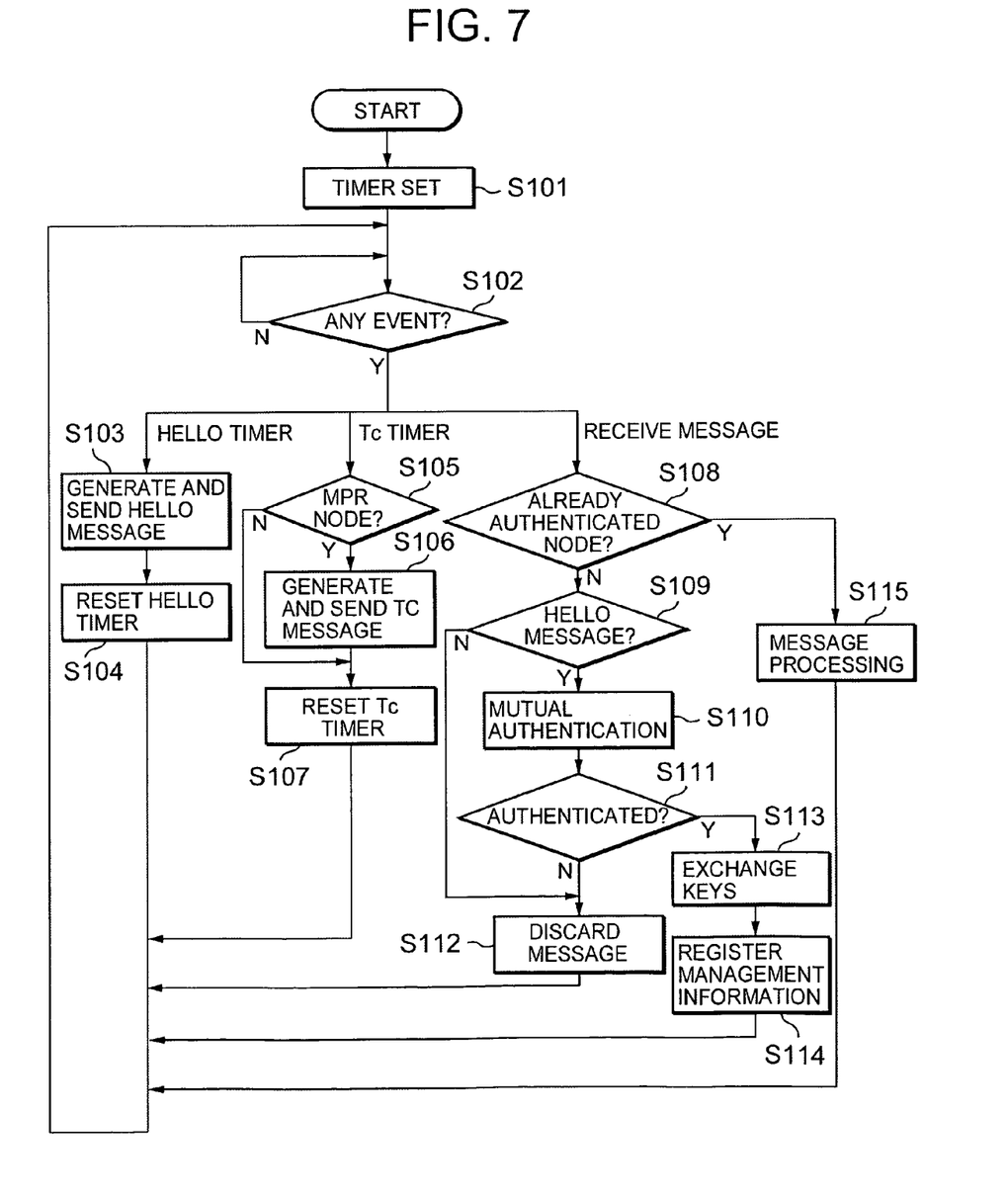
FIG. 7 is a flow diagram to explain a communication control processing in the communication terminal 10.

Next, a communication control processing in the communication terminal 10 will be explained with reference to the flow diagram as shown in FIG. 7.

The processing here controls transmission of Hello message and Tc message, by use of a timer. In other words, if the transmission interval of Hello messages and that of Tc messages are assumed to be 2 seconds and 5 seconds, respectively, the Hello timer is set to 2 seconds, and the Tc timer is set to 5 seconds, whereby allowing a timeout event to occur at respective intervals (S101).

Then, the next step is to wait for the event to occur (S102). Receipt of a message from another communication terminal 10 and the like may be considered as an example of the event, other than the timeout event.

When the communication terminal 10 detects the occurrence of event (S102: Y), a processing according to the event is performed.

In other words, if the event thus occurred is a timeout event of the Hello timer, the processing generates a Hello message, and broadcasts the Hello message thus generated (S103). It is possible to generate the Hello message based on the information recorded in the ad hoc network management information storage 130. Then, the next step is to reset the Hello timer (S104), and wait for the next event occurrence (S102).

Alternatively, if the event thus occurred is a timeout event of the Tc timer, the own node information 131 in the ad hoc network management information storage 130 is referred to, and it is determined whether or not the own node is selected as MPR node (S105). As a result, if the own node is not selected as MPR node, the next step is to reset Tc time (S107), and wait for the next event occurrence (S102). On the other hand, if the own node is selected as MPR node, the next step generates Tc message and broadcasts the Tc message thus generated (S106). Then, the next step is to reset the Tc timer (S107) and wait for the next event occurrence (S102).

Hereinafter, an explanation as to the Tc message will be made. FIG. 4B is a diagram showing an example of Tc message format. In the example as shown in FIG. 4B, the Tc message 410 includes, message type 411 indicating it is Tc message, source node ID 412 indicating a transmission node of Tc message, generation source node ID 413 indicating a generation source of the Tc message, a direct node list 414 for the generation node of Tc message, ad hoc key 415, ad hoc key identifier 416, ad hoc key generation time 417, and MAC 418 assuring integrity of the message contents.

As for the generation source node ID 413, the direct and selected MPR node list 414 for the generation source node, the ad hoc key 415, the ad hoc key identifier 416, the ad hoc key generation time 417, and MAC code 418, within the elements above, they are encrypted by use of an inside-circle key of the sending source node. At least, the ad hoc key 415, the ad hoc key identifier 416, the ad hoc key generation time 417 are encrypted by use of an inside-circle key of the sending source node.

The communication terminal 10 which currently selected as MPR is allowed to generate a Tc message based on the information recorded in the ad hoc network management information storage 130.

Next, generation of the ad hoc key in the MPR node will be explained. The communication terminal 10 which has recognized that the own terminal is now selected as MPR node, upon receipt of Hello message from another communication terminal 10, generates an ad hoc key and an ad hoc key identifier according to a predetermined rule. Then, the communication terminal 10 records thus generated ad hoc key, ad hoc key identifier, and ad hoc key generation time in the own node information 131 of the ad hoc network management information storage 130. In addition, MPR flag 131b is turned ON. The rule for generating the ad hoc key and the ad hoc key identifier is, for example, recorded in the policy storage 150 as a key generation policy.

Subsequently, using the timeout of the Tc timer as a trigger, the communication terminal 10 refers to the ad hoc network management information storage 130, so as to obtain information to generate Tc message. Then, the communication terminal 10 generates Tc message having been encrypted with its own inside-circle key, and broadcasts the Tc message thus generated. Accordingly, it is possible to securely distribute own ad hoc key in the circle. As explained below, one of the other MPR nodes, which has received the Tc message encrypts the Tc message having been decrypted, with an inside-circle key of its own, and transfers the message into the circle of its own. By repeating the processing above, it is possible to securely share the ad hoc key generated by each MPR node together with the ad hoc key identifier, among all the communication terminals 10, which constitute the ad hoc network.

Now returning to FIG. 7, if the event thus occurred is a message receiving from the other communication terminal 10, it is determined whether or not the communication terminal 10 is an authenticated terminal (S108). It is possible to determine whether or not the communication terminal 10 is authenticated, by referring to the direct node information 133 of the ad hoc network management information storage 130.

As a result, if the communication terminal 10 has not been authenticated yet (S108: N), it is checked whether the message is Hello message or not (S109). If the message is not Hello message, it is regarded as a message from not-yet-authenticated communication terminal 10, and the message thus received is discarded (S112). On the other hand, if it is Hello message, mutual authentication is performed with the not-yet-authenticated communication terminal 10 (s110).

The mutual authentication may be started at the time when both communication terminals 10 confirm each other, or one communication terminal 10 recognizes the other terminal. It is possible to record as an authentication policy in the policy storage 150, what procedure is to be taken for the mutual authentication. It is further possible to record as the authentication policy, an interval period for reauthentication, continuing counts of authentication, authentication level, and the like.

In addition, as described in detail in ISO/IEC9798, the authentication processing is implemented by exchanging messages for a plurality of times. Accordingly, in practice, the mutual authentication (S110) is carried out by exchanging messages for a plurality of times between the communication terminals 10.

Figure 8A:
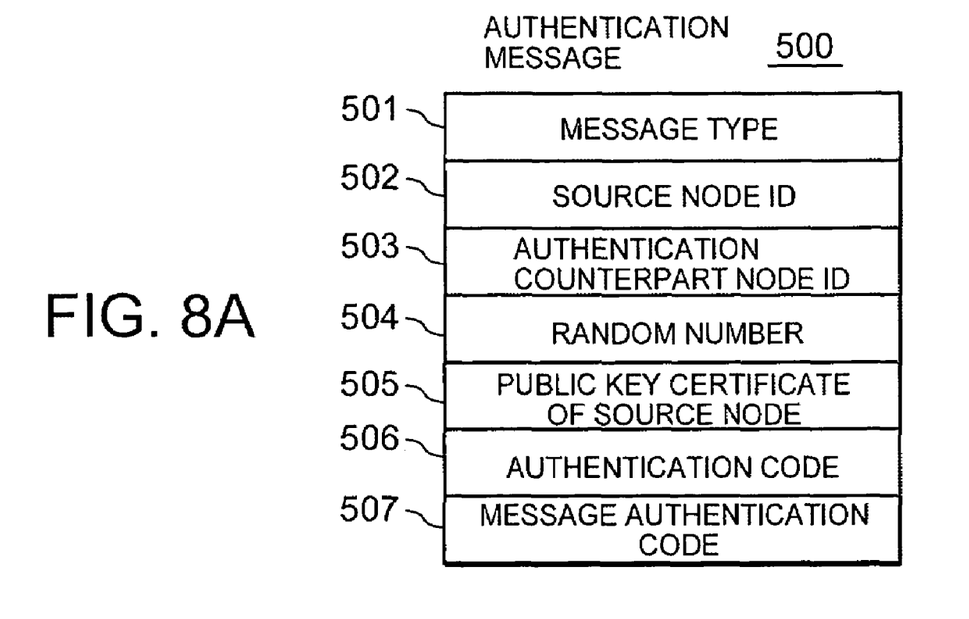
FIG. 8A is a diagram showing an example of an authentication message which is exchanged in mutual authentication.

FIG. 8A is a diagram showing an example of an authentication message exchanged in mutual authentication. In the example as shown in FIG. 8A, the authentication message 500 may include, message type 501 indicating that it is an authentication message, a sender node ID 502 for identifying the communication terminal 10 as a sending source of the authentication message, authentication counterpart node ID 503 for identifying the communication terminal 10 as an authentication counterpart, random number 504 generated by the communication terminal 10 as a sending source, sender public key certificate 505, authentication code 506, and MAC 507 for assuring integrity of the message contents. Here, the authentication code 506 is a code which is generated by the communication terminal 10 as a sending source using private key information, with respect to the random number generated by the authentication counterpart. For example, IP address may serve as the sender node ID 502, and the authentication counter part node ID 503.

As a result of the mutual authentication, if the communication counterpart cannot be authenticated (Sill: N), the communication terminal 10 is regarded as not belonging to the group. Then, connection to the ad hoc network is not permitted and the Hello message thus received is discarded (S112). With this processing flow, it is possible to prevent that communication terminal 10 outside the group is connected to the ad hoc network.

It is further possible to reflect the result of the authentication onto the authentication policy, and to set a condition for a retry of authentication with the communication terminal 10 with which the authentication has once failed. Concretely, a condition may be set, such as not performing authentication for a certain period of time after the failure of authentication, even when a Hello message is received.

As a result of the mutual authentication, when the communication counterpart is authenticated (S111: Y), the communication terminal 10 is regarded as belonging to the group. Therefore, a connection of the communication terminal 10 to the ad hoc network is permitted, and exchange of inter-node key and inside-circle key is carried out between the communication terminals 10 (S113). In addition, information required for the ad hoc network management information storage 130 is registered.

Figure 8B:
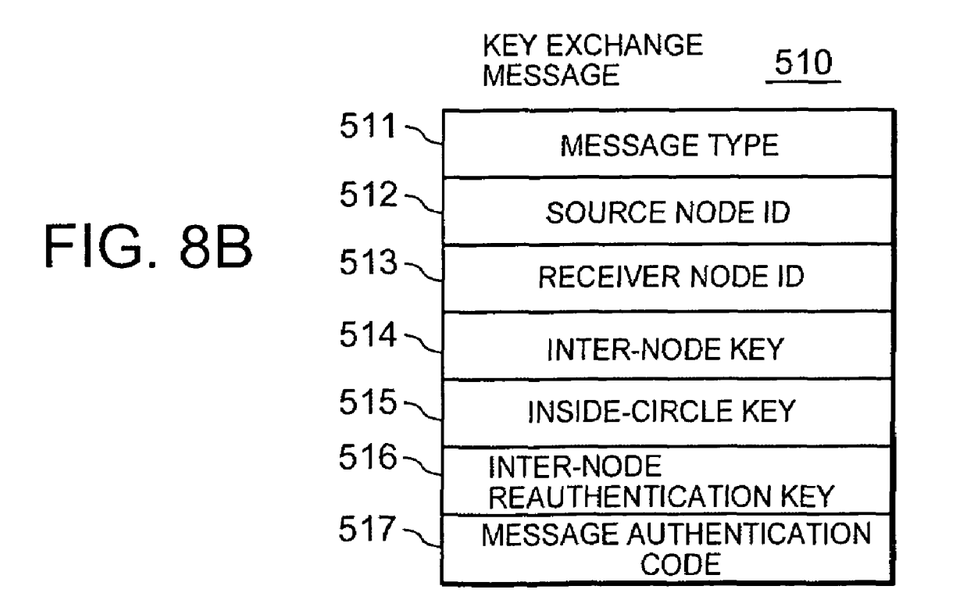
FIG. 8B is a diagram showing an example of a key exchange message which is exchanged after the mutual authentication.

FIG. 8B is a diagram showing an example of a key exchange message, which is exchanged after the mutual authentication. In the example of FIG. 8B, the key exchange message includes, key type 511 indicating it is key exchange message, a sender node ID 512 for identifying the communication terminal 10 as a sending source of the key exchange message, a receiver node ID 513 for identifying the communication terminal 10 as a destination of the key exchange message, inter-node key 514, inside-circle key 515, inter-node reauthentication key 516, and MAC 517 assuring integrity of the message contents.

Within those elements above, the inter-node key 514, inside-circle key 515, inter-node reauthentication key 516, and MAC 517 are encrypted, for instance, by use of a public key of the communication terminal 10 on the receiving side. As a way of example, IP address may serve as the sender node ID 512 and the receiver node ID 513.

Accordingly, it is possible to securely distribute the inside-circle key to the communication terminals 10 belonging to a group, which exists within the wireless communication area.

It is to be noted here that in the example of FIG. 7, once the mutual authentication is completed, the authentication processing will not be restarted at a later time. However, it is possible to autonomously start the authentication and/or key updating at regular time intervals or at a time which each terminal recognizes that it is necessary. In the case above, a reauthentication key shared at the time of the first authentication is utilized for the reauthentication. For the key updating, a new key is generated, being encrypted by an old key, and the key thus encrypted is delivered. Rules as described above can be recorded in the policy storage 150, as an authentication policy or reauthentication policy.

If an event having occurred is a message receiving from another communication terminal 10 having been authenticated (S108: Y), the message type is referred to, and a processing associated with the message is carried out (S115).

In other words, if the message is Hello message, the ad hoc network management information storage 130 is updated as appropriate. Alternatively, if the message is Tc message, the ad hoc network management information storage 130 is updated as appropriate, and in addition, the communication terminal transfers the Tc message thus received to a neighbor node, if the own terminal is selected as MPR node.

If the message thus received is a data communication message, the communication terminal refers to a destination of control information of the data communication message. And, if the destination indicates another communication terminal 10, the ad hoc network management information storage 130 is referred to, and data transfer to the other node is requested.

On the other hand, if the destination indicates its own communication terminal 10, the data communication message is taken in, and the part of the message 423, being encrypted, is decrypted by use of the ad hoc key indicated by the ad hoc key identifier 422.

By the way, when a communication terminal 10 newly participates to the ad hoc network, the mutual authentication is performed as described above, and key information is distributed. On the other hand, there is also a case that a communication terminal 10 constituting the ad hoc network may deviate from the ad hoc network, due to moving and the like.

In such a case, in order to maintain the security level in the ad hoc network, it becomes necessary to update the key associated with the communication terminal 10 thus left, so as to invalidate the key.

In the ad hoc network where the communication terminal 10 moves intensely, a load on the security processing is enormously increased, which is caused by mutual authentication due to a new connection and key information updating due to deviation.

In order to reduce the load, according to the present invention, it is possible to configure such that a relaxation condition such as permitted deviation time is set, and if the communication terminal moves within the range of the relaxation condition, it is not regarded as deviating from the ad hoc network, but as moving within the ad hoc network. Therefore, updating of security information, such as key updating, may not be performed.

Hereinafter, with FIG. 1, an explanation will be made, taking as an example the case where the communication terminal 10 (A2) connected to the communication terminal 10 (A1) has moved, and consequently, the connection with the communication terminal 10 (A1) has been disconnected, and a connection with the communication terminal 10 (A3) is established.

The permitted deviation time as relaxation condition is previously set for each communication terminal 10. In this example, the permitted deviation time of the communication terminal 10 (A1) is assumed as T1, and that of the communication terminal 10 (A3) is assumed as T3. It is also configured such that the permitted deviation time is recorded in the policy storage 150 as a relaxation policy.

In addition to the permitted deviation time, it is also possible to record a level of authentication, idle time, and the like, as the relaxation policy.

When the communication terminal 10 (A2) connected to the communication terminal 10 (A1) moves or the like and the communication terminal 10(A1) goes out of the wireless communication area of the communication terminal 10 (A2), Hello message periodically transmitted from the communication terminal 10 (A2) does not reach the communication terminal 10 (A1) any more. This allows the communication terminal 10 (A1) to recognize that the communication terminal 10 (A2) has deviated. From this point of time, the communication terminal 10 (A1) starts counting of time W to determine whether or not the deviation of the communication terminal 10 (A2) is a temporal shift caused by moving within the ad hoc network.

If the time W exceeds the permitted deviation time T1, it is determined as not a temporary deviation, and then, the security information is updated. Concretely, after mutual authentication with the neighbor node, re-exchanging the inside-circle key and the ad hoc key of the communication terminal 10 (A1) is carried out. In the case where the communication terminal 10 (A2) is selected as MPR node, since Tc message from the communication terminal 10 (A2) is not reachable any more, information regarding the communication terminal 10 (A2) in the MPR node information 132 of the ad hoc network management information storage 130 is deleted.

On the other hand, as a result of moving or the like of the communication terminal 10 (A2), if the communication terminal 10 (A3) comes into the wireless communication area of the communication terminal 10 (A2), Hello message transmitted from the communication terminal 10 (A2) is allowed to reach the communication terminal 10 (A3). Accordingly, the communication terminal 10 (A3) now recognizes that the communication terminal 10 (A2) has moved in.

The communication terminal 10 (A3) already knows that the communication terminal 10 (A2) deviated from the communication terminal 10 (A1), according to the Hello message or Tc message from the communication terminal 10 (A1). Then, the communication terminal 10 (A3) calculates time U from the point when the communication terminal 10 (A2) starts deviation, to the point when it is detected that the terminal A2 has moved in.

If the time U is equal to or less than the permitted deviation time T2 of the relaxation condition, it is determined as a temporary deviation, and the communication terminal 10 (A3) does not execute mutual authentication with the communication terminal 10 (A2). Then, the communication terminal 10 (A3) distributes its own held security information to the communication terminal 10 (A2), concretely, the inside-circle key, ad hoc key and the like of the communication terminal 10 (A3). Accordingly, it is possible to reduce the load of mutual authentication processing.

On the other hand, if the time U exceeds the permitted deviation time T2 of the relaxation condition, it is determined as not a temporary deviation. Therefore, firstly, the communication terminal 10 (A3) performs mutual authentication with the communication terminal 10 (A2), and then delivers security information.

Then, the communication terminal 10 (A3) issues a notification in the ad hoc network that the communication terminal 10 (A2) has become a neighbor node, by transmitting Hello message and Tc message.

When the communication terminal 10 (A1) detects that the communication terminal 10 (A2) has become a neighbor node of the communication terminal 10 (A3), the communication terminal 10 (A1) compares the time W at that point of time, and the permitted deviation time T1 of the relaxation condition.

As a result, if the time W is within the permitted deviation time T1, it is determined that the deviation of the communication terminal 10 (A2) is temporary shift and the security information is not updated. Then, updating with regard to the network configuration is executed, such as deleting the communication terminal 10 (A2) from the direct node information 133 of the ad hoc network management information storage 130, and adds the communication terminal 10 (A2) to the indirect node information 134.

On the other hand, if the time W exceeds the permitted deviation time T1, it is determined that the deviation of the communication terminal 10 (A2) is not temporary shift, and the security information is updated as described above. In other words, mutual authentication with the neighbor node is executed again, and the inside-circle key and ad hoc key of the communication terminal 10 (A1) are updated. If the communication terminal 10 (A2) is selected as MPR node, Tc message from the communication terminal 10 (A2) does not reach any more. Therefore, information regarding the communication terminal 10 (A2) in the MPR node information 132 of the network management information storage 130 is deleted.

In other words, the communication terminal (A1 in the above example) having been connected to the moved communication terminal 10, updates the information regarding the network configuration without updating the security information, if the deviation time is within the permitted deviation time. On the other hand, if the deviation time exceeds the permitted deviation time, both the security information and the information regarding the network configuration are updated. In this example, if the deviation time is within the permitted deviation time, the security information is not updated. However, it is possible to update a part of the security information, for example, updating only the inside-circle key.

Furthermore, the communication terminal 10 (A3 in the above example) to be connected with the communication terminal 10 which moved in, updates the security information such as key distribution and the information regarding the network configuration without executing mutual authentication, if the deviation time is within the permitted deviation time. On the other hand, if the deviation time exceeds the permitted deviation time, firstly mutual authentication is executed, and then, the security information and the information regarding the network configuration are updated.

As described above, according to the present invention, it is possible to share an encryption key, which is commonly used in the ad hoc network. In addition, according to the present invention, it is possible to efficiently execute an authentication processing in the ad hoc network.

What is claimed is:

1. A common key sharing method in an ad hoc network constituted by wireless communication terminals implemented with relay functions thereon, comprising:

a common key generating step in which a first wireless communication terminal responsible for relaying generates a common key shared within said ad hoc network;

a common key distributing step in which said first wireless communication terminal responsible for relaying distributes said common key to each of a plurality of other wireless communication terminals within a wireless communication area; and a transferring step in which each of said plurality of wireless communication terminals which received said common key holds said common key, and when one or more of said plurality of wireless communication terminals are responsible for relaying, said plurality of wireless communication terminals being responsible for relaying transfers said common key to other one of each of said plurality of wireless communication terminals within a wireless communication area.

2. The common key sharing method according to claim 1, comprising,
- an inter-transmission-area distributing step in which the first wireless communication terminal distributes an inter-transmission-area key to each of the plurality of wireless communication terminals within the wireless communication area, wherein,
- said inter-transmission-area distributing step encrypts said common key with said inter-transmission-area key, and distributes said common key thus encrypted.

3. The common key sharing method, according to claim 2, comprising,
- a mutual authentication step which performs mutual authentication between the first wireless communication terminal and each of the plurality of other wireless communication terminals within the wireless communication area, wherein,
- said inter-transmission-area distributing step distributes said inter-transmission-area key to the second wireless communication terminal thus authenticated.

4. The common key sharing method according to any one of claims 1 to 3, wherein,
- said common key is identifiable according to an identifier.

5. The common key sharing method, according to claim 4, wherein,
- said identifier is generated, distributed, and transferred, together with said common key.

6. The common key sharing method according to claim 1, wherein said common key is an ad-hoc-network common key shared in common by at least three of the wireless communication terminals of the ad hoc network.

7. A wireless communication terminal implemented with a relay function for constituting an ad hoc network, comprising:
- a network information generating means in which said wireless communication terminal sends/receives information regarding network configuration to/from each of a plurality of wireless communication terminals within a wireless communication area and generates network configuration information;
- a common key generating means in which said wireless communication terminal generates a common key to be shared within said ad hoc network when said wireless communication terminal itself being determined as responsible for relaying based on said network configuration information;
- a common key distributing means in which said wireless communication terminal distributes said common key thus generated to each of the plurality of wireless communication terminals within the wireless communication area; and
- a transferring means in which when each of the plurality of wireless communication terminals receives said common key, each of the plurality of wireless communication terminals holds said common key, and transfers said common key thus received to other one of each of the plurality of wireless communication terminals within the wireless communication area, when each of the plurality of wireless communication terminals itself being determined as responsible for relaying.

8. The wireless communication terminal according to claim 7, comprising an authentication means, which authenticates each of the plurality of wireless communication terminals within the wireless communication area, wherein,
- said network information generating means sends/receives the information regarding the network configuration to/from each of the plurality of wireless communication terminals, which has been authenticated.

9. The wireless communication terminal according to claim 8, wherein,
- said network configuration information is an information to recognize the wireless communication terminals constituting the ad hoc network, and
- when each of the plurality of wireless communication terminals having been authenticated moves out of the wireless communication area and each of the plurality of wireless communication terminals is not recognized as the wireless communication terminal constituting the ad hoc network within a predetermined period of time, said common key generating means updates the common key, and said common key distributing means distributes said common key thus updated.

10. The wireless communication terminal according to claim 8, wherein,
- said network configuration information is an information to recognize the wireless communication terminal constituting the ad hoc network, and
- when each of the plurality of wireless communication terminals having constituted the ad hoc network moves out of the ad hoc network and returns into the wireless communication area within a predetermined period of time, said authentication means does not authenticate each of the plurality of wireless communication terminals.

11. The wireless communication terminal according to claim 7, wherein said common key is an ad-hoc-network common key shared in common by at least three of the wireless communication terminals of the ad hoc network.

* * * * *